(12) United States Patent
Shimizu et al.

(10) Patent No.: US 9,218,812 B2
(45) Date of Patent: Dec. 22, 2015

(54) VEHICULAR DEVICE, SERVER, AND INFORMATION PROCESSING METHOD

(71) Applicant: Clarion Co., Ltd., Saitama-shi, Saitama (JP)

(72) Inventors: Atsushi Shimizu, Tokyo (JP); Qingzhu Duan, Tokyo (JP); Takaaki Sekiguchi, Tokyo (JP); Yasushi Nagai, Saitama (JP); Haruhiko Sawajiri, Saitama (JP); Takashi Yamaguchi, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 15 days.

(21) Appl. No.: 14/322,429

(22) Filed: Jul. 2, 2014

(65) Prior Publication Data

US 2015/0095037 A1  Apr. 2, 2015

(30) Foreign Application Priority Data

Sep. 27, 2013  (JP) .................................. 2013-200754

(51) Int. Cl.
*G10L 21/00* (2013.01)
*G10L 25/00* (2013.01)
*G10L 13/00* (2006.01)
*G10L 15/00* (2013.01)
(Continued)

(52) U.S. Cl.
CPC .............. *G10L 15/22* (2013.01); *B60R 16/0373* (2013.01); *G10L 2015/227* (2013.01); *G10L 2015/228* (2013.01)

(58) Field of Classification Search
CPC ......... G10L 15/26; G10L 15/22; G10L 17/22; G10L 21/06; G10L 13/02; G10L 15/02; G10L 15/30; G10L 13/027; G10L 13/033; G10L 2015/223; G10L 13/00; G06F 2203/0381

USPC ......... 704/233, 235, 246, 255, 257, 260, 261, 704/270, 270.1, 275
See application file for complete search history.

(56) References Cited

U.S. PATENT DOCUMENTS 6,236,968 B1    5/2001  Kanevsky et al.
6,600,975 B2 *  7/2003  Moriguchi et al. ............... 701/1
(Continued)

FOREIGN PATENT DOCUMENTS

JP    2003-131691 A    5/2003

OTHER PUBLICATIONS

European Patent Office extended search report on application 14175255.0 mailed Feb. 26, 2015; 6 pages.

*Primary Examiner* — Edgar Guerra-Erazo
(74) *Attorney, Agent, or Firm* — Foley & Lardner LLP

(57) ABSTRACT

The technique is implemented by a vehicular device for performing dialogs with the driver. This device has: a communication portion for communicating with a server; an output portion for outputting speech information to the driver; an input portion for inputting information based on speech uttered by the driver; and a controller for controlling the communication portion, the output portion, and the input portion. When trigger information for starting a dialog process in the vehicular device or in the server is generated, the controller receives information indicative of the type of a first dialog forming a starting point of the dialog process and information indicative of the type of a second dialog forming an ending point of the dialog process from the server and carries out the dialog process based on the received information. The second dialog is different in type from the first dialog.

13 Claims, 14 Drawing Sheets

(51) Int. Cl.
*G10L 15/22* (2006.01)
*B60R 16/037* (2006.01)

(56) References Cited

U.S. PATENT DOCUMENTS

| | | | |
|---|---|---|---|
| 6,721,706 B1* | 4/2004 | Strubbe et al. | 704/275 |
| 7,069,221 B2* | 6/2006 | Crane et al. | 704/275 |
| 7,292,152 B2* | 11/2007 | Torkkola et al. | 340/576 |
| 7,349,782 B2* | 3/2008 | Churchill et al. | 701/45 |
| 7,609,150 B2* | 10/2009 | Wheatley et al. | 340/436 |
| 7,734,468 B2* | 6/2010 | Park et al. | 704/270 |
| 8,275,348 B2* | 9/2012 | Yen et al. | 455/404.1 |
| 2003/0054865 A1* | 3/2003 | Byers et al. | 455/567 |
| 2005/0267759 A1 | 12/2005 | Jeschke et al. | |
| 2006/0247913 A1* | 11/2006 | Huerta et al. | 704/1 |
| 2006/0247931 A1* | 11/2006 | Caskey et al. | 704/270 |
| 2007/0008239 A1* | 1/2007 | Stroupe et al. | 345/1.1 |
| 2009/0086953 A1* | 4/2009 | Vendrow | 379/207.02 |
| 2013/0211841 A1 | 8/2013 | Ehsani et al. | |

* cited by examiner

FIG. 4

D: DRIVER
S: SYSTEM

| | | |
|---|---|---|
| 401 — TYPE OF EXTERNAL SERVICE | DIAGNOSIS ON FUEL SAVING DRIVING | SNS → CALENDAR |
| 402 — TYPE OF START OF DIALOG | EVENT FROM VEHICULAR DEVICE | EVENT FROM EXTERNAL SERVICE SERVER |
| 403 — SEQUENCE OF DIALOG | D: (DURING MOVEMENT TO DESTINATION, DRIVER PULLED INTO GAS STATION AND PUT GASOLINE INTO THE VEHICLE. ENGINE WAS RESTARTED.)<br><br>S: HAVE YOU JUST PUT GASOLINE INTO IT?<br><br>D: YES.<br><br>S: HOW MANY LITERS OF GASOLINE HAVE YOU PUT INTO IT?<br><br>D: 30 LITERS.<br><br>S: 30 LITERS? CAN I REGISTER THE DATA INTO FUEL SAVING DRIVING DIAGNOSIS SERVICE?<br><br>D: OK.<br><br>S: THANK YOU FOR YOUR DATA REGISTRATION. I WILL DISPLAY YOUR DEGREE OF FUEL SAVING DRIVING. | S: THERE WILL BE AN EVENT ○○ WITHIN A FEW DAYS. IT WILL BE HELD AT △△ ON □□.<br><br>D: IS YOUR SCHEDULE TIGHT ON THAT DAY?<br><br>S: FREE.<br><br>...<br><br>D: PLEASE REGISTER IT ON CALENDAR.<br><br>S: SURELY, I WILL REGISTER IT ON CALENDAR. |

FIG. 5

| | | | |
|---|---|---|---|
| EVENT | 1 | EXTERNAL SERVER EVENT | • FRESH NEWS, SNS, CALENDAR, NEWS, WEATHER, ETC. |
| | 2 | VEHICULAR DEVICE EVENT | • CIRCUMSTANCES OF VEHICULAR DEVICE, CIRCUMSTANCES OF ROUTE, EVENTS REGARDING CIRCUMSTANCES OF VEHICLE (TEXT READ OUT BY VEHICULAR DEVICE IS EXPLOITED.)<br>• ACC IS TURNED ON; POSITIONAL INFORMATION; POSITIONAL INFORMATION INDICATES CLOSENESS TO A GAS STATION; WITHIN 3 MINUTES SINCE RELEASE OF PARKING BRAKE; DESTINATION WAS SET AFTER GETTING INTO THE VEHICLE. |
| ENVIRONMENTAL INFORMATION | 3 | VEHICULAR CIRCUMSTANCES | • ACCELERATION OR SPEED VARIES GREATLY; HORN IS SOUNDED; DURING PARKING (DURING DRIVING FOR PARKING), ETC. |
| | 4 | CIRCUMSTANCES OF VEHICLE INTERIOR | • VOICE IS INPUT TO MICROPHONE.<br>• VOICES OF PLURAL PERSONS ARE INPUT TO MICROPHONE. |
| | 5 | CIRCUMSTANCES OF VEHICULAR DEVICE | • DURING MANIPULATION OF NAVIGATION SYSTEM<br>  • DURING MANIPULATION OF MENU OF NAVIGATION SYSTEM<br>• DURING USE OF VOICE RESOURCES (MICROPHONE OR SPEAKER)<br>  • DURING HANDS-FREE TELEPHONE CONVERSATIONS<br>  • DURING DSRC GUIDE • DURING VICS GUIDE<br>  • DURING ETC GUIDE • DURING UTTERANCE FOR ROUTE GUIDE<br>  • DURING INPUT TO MICROPHONE<br>• CIRCUMSTANCES WHERE DRIVING NEEDS ATTENTION<br>  • DURING ENTRY/DEPARTURE TO/FROM HIGHWAY<br>  • DURING ENTRY/DEPARTURE TO/FROM HIGHWAY JUNCTION<br>  • DURING BACKING (START/END) |

FIG. 7

| EVENT | SNS HAS EVENT GUIDE (TODAY) | | |
|---|---|---|---|
| DRIVER'S STATE | VERY BUSY | SOMEWHAT BUSY | NON-BUSY |
| PRESENCE/ABSENCE OF FELLOW PASSENGER | — | — | — |
| PRESENCE/ABSENCE OF CONTRACT OF EXTERNAL SERVICES | — | · NO WEATHER INFORMATION<br>· THERE IS TRAFFIC INFORMATION | · THERE IS WEATHER INFORMATION<br>· NO TRAFFIC INFORMATION | · NO WEATHER INFORMATION<br>· THERE IS TRAFFIC INFORMATION | · THERE IS WEATHER INFORMATION<br>· NO TRAFFIC INFORMATION |

↓SELECTION

| STARTING POINT DIALOG DOMAIN → ENDING POINT DIALOG DOMAIN | SNS<br>→ANNOUNCE-MENT | SNS<br>→ANNOUNCE-MENT | SNS<br>→TRAFFIC INFORMATION | SNS<br>→TRAFFIC INFORMATION | SNS<br>→WEATHER |
|---|---|---|---|---|---|
| SEQUENCE OF DIALOG | <TRIGGER IS PUT INTO QUEUE WITHOUT UTTERANCE OF SPEECH> | S: TODAY, THERE IS AN EVENT OO. A LINK TO NAVIGATION SCREEN IS SET UP. PLEASE SEE IT AT YOUR CONVENIENT TIME. | S: TODAY, THERE IS AN EVENT OO. A LINK TO NAVIGATION SCREEN IS SET UP. PLEASE SEE IT AT YOUR CONVENIENT TIME. | S: TODAY, THERE IS AN EVENT OO. IT WILL BE HELD AT △△ AT □□ O'CLOCK.<br>D: I WOULD LIKE TO GO TO IT AT ANY COST.<br>S: IT TAKES ABOUT ** MINUTES TO GO FROM HERE TO △△ VIA ROUTE AVOIDING THE TRAFFIC RESTRICTION. DO YOU SET THE ROUTE?<br>D: SET IT AS THE ROUTE.<br>S: I WILL SET IT AS THE ROUTE. | S: TODAY, THERE IS AN EVENT OO. IT WILL BE HELD AT △△ AT □□ O'CLOCK.<br>D: I WOULD LIKE TO GO TO IT AT ANY COST.<br>S: IT IS FORECAST TO BE CLOUDY AT △△ AROUND □□ O'CLOCK.<br>D: YET, I REFRAIN FROM GOING.<br>S: OK. I WILL NOT SET IT AS ROUTE. |

FIG. 8

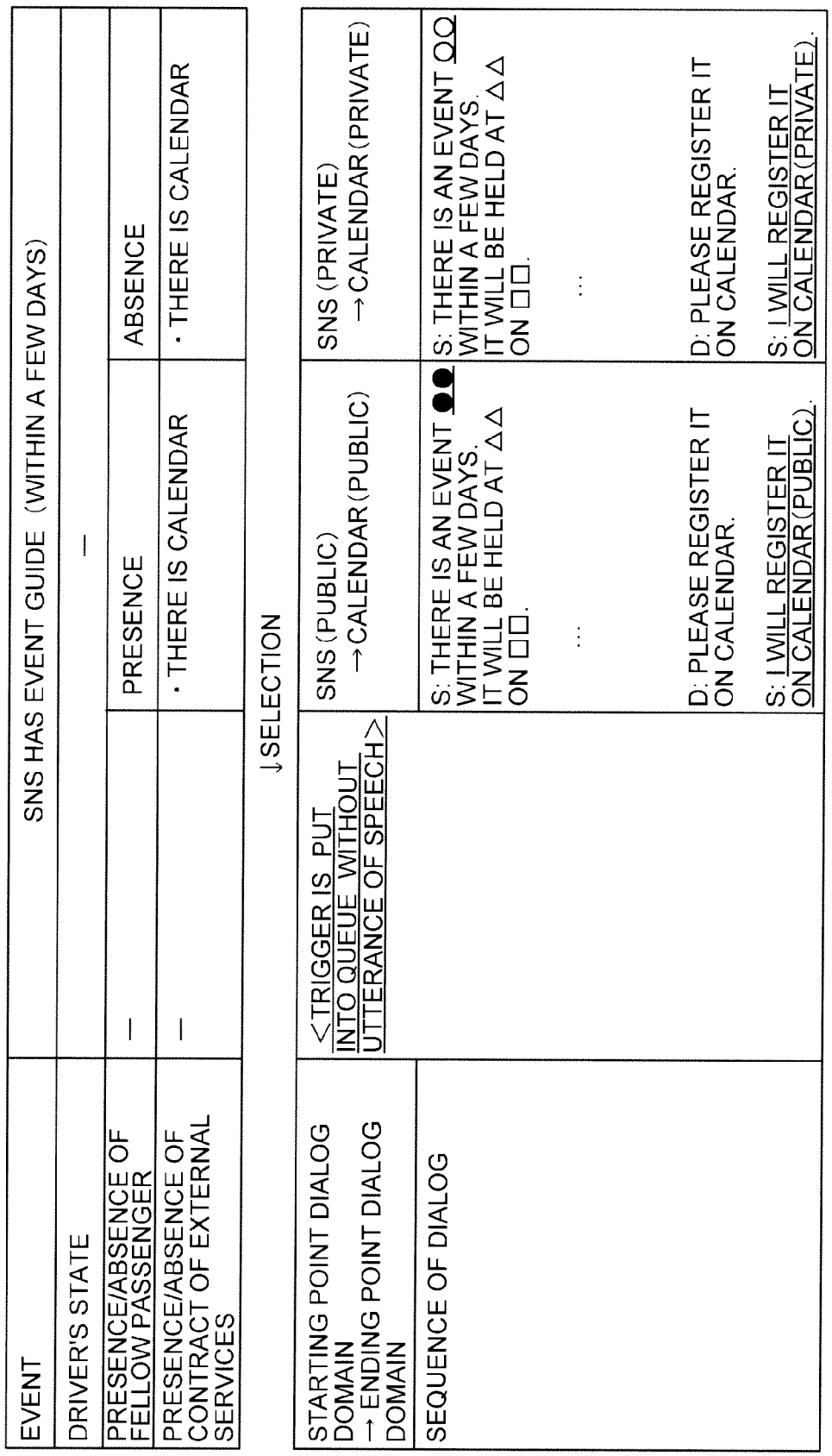

| EVENT | SNS HAS EVENT GUIDE (WITHIN A FEW DAYS) | |
|---|---|---|
| DRIVER'S STATE | — | |
| PRESENCE/ABSENCE OF FELLOW PASSENGER | PRESENCE | ABSENCE |
| PRESENCE/ABSENCE OF CONTRACT OF EXTERNAL SERVICES | • THERE IS CALENDAR | • THERE IS CALENDAR |

↓SELECTION

| STARTING POINT DIALOG DOMAIN → ENDING POINT DIALOG DOMAIN | <TRIGGER IS PUT INTO QUEUE WITHOUT UTTERANCE OF SPEECH> | SNS (PUBLIC) → CALENDAR (PUBLIC) | SNS (PRIVATE) → CALENDAR (PRIVATE) |
|---|---|---|---|
| SEQUENCE OF DIALOG | | S: THERE IS AN EVENT ●● WITHIN A FEW DAYS. IT WILL BE HELD AT △△ ON □□. ⋮ D: PLEASE REGISTER IT ON CALENDAR. S: I WILL REGISTER IT ON CALENDAR(PUBLIC). | S: THERE IS AN EVENT ○○ WITHIN A FEW DAYS. IT WILL BE HELD AT △△ ON □□. ⋮ D: PLEASE REGISTER IT ON CALENDAR. S: I WILL REGISTER IT ON CALENDAR(PRIVATE). |

FIG. 9

| SEQUENCE OF DIALOG | S: THERE IS AN EVENT OO WITHIN A FEW DAYS. SINCE IT IS PUT IN REMARKS COLUMN OF K CALENDAR, PLEASE CHECK IT LATER. *[STARTING POINT] [ENDING POINT]* | S: THERE IS AN EVENT OO WITHIN A FEW DAYS. SINCE A NOTE IS MADE OF IT, PLEASE CHECK IT LATER. *[STARTING POINT] [ENDING POINT]* | S: THERE IS AN EVENT OO WITHIN A FEW DAYS. IT WILL BE HELD AT △△ ON □□. *[STARTING POINT]* <br><br> D: PLEASE REGISTER IT ON CALENDAR. <br><br> S: I WILL REGISTER IT ON CALENDAR. *[ENDING POINT]* | S: THERE IS AN EVENT OO WITHIN A FEW DAYS. IT WILL BE HELD AT △△ ON □□. *[STARTING POINT]* <br><br> D: PLEASE TAKE A NOTE OF IT. <br><br> S: I WILL TAKE A NOTE OF IT. *[ENDING POINT]* |
|---|---|---|---|---|

FIG. 11

| SENTENCE ID | SENTENCE | ATTRIBUTE |
|---|---|---|
| 1 | S: TODAY. THERE IS AN EVENT ○○. A LINK TO NAVIGATION SCREEN IS SET UP. PLEASE SEE IT AT YOUR CONVENIENT TIME | STARTING AND ENDING POINT |
| 2 | S: TODAY, THERE IS AN EVENT ○○. IT WILL BE HELD AT △△ AT □□ O'CLOCK. | STARTING POINT |
| 3 | S: IT TAKES ABOUT ✻✻ MINUTES TO GO FROM HERE TO △△ VIA ROUTE AVOIDING THE TRAFFIC RESTRICTION. DO YOU SET THE ROUTE ? | NEITHER STARTING POINT NOR ENDING POINT |
| 4 | S: I WILL SET IT AS ROUTE. | ENDING POINT |
| 5 | S: I THOUGHT THAT THE SCHEDULE WOULD BE REGISTERED ON CALENDAR. THIS ACCOUNT IS HALTED. | INTERIM REPORT |
| ⋮ | ⋮ | |

FIG. 12

| EVENT | TRIGGER | TRIGGER PRIORITY |
|---|---|---|
| · TRAFFIC INFORMATION ABOUT THE VICINITIES OF DESTINATION IS RECEIVED.<br>· SET DESTINATION. | · ACCIDENT OCCURRED NEAR DESTINATION. | 60 |
| · ACC IS TURNED ON.<br>· POSITIONAL INFORMATION INDICATES CLOSENESS TO GAS STATION. | · ACC WAS TURNED ON NEAR GAS STATION. | 110 |
| · PRESENT LOCATION.<br>· PREVIOUS DRIVING HISTORY. | · DRIVING ON ROUTE NORMALLY TAKEN. | 130 |
| · PRESENT LOCATION.<br>  DESTINATION. | · APPROACHING DESTINATION | 150 |
| · DESTINATION WAS SET AFTER GETTING INTO THE VEHICLE.<br>· VEHICLE IS SET INTO MOTION. | · DESTINATION IS SET. VEHICLE IS SET INTO MOTION. | 130 |
| · ACC IS TURNED ON.<br>· THERE IS FRESH NEWS. | · ACC IS TURNED ON WHILE THERE IS FRESH NEWS. | 120 |

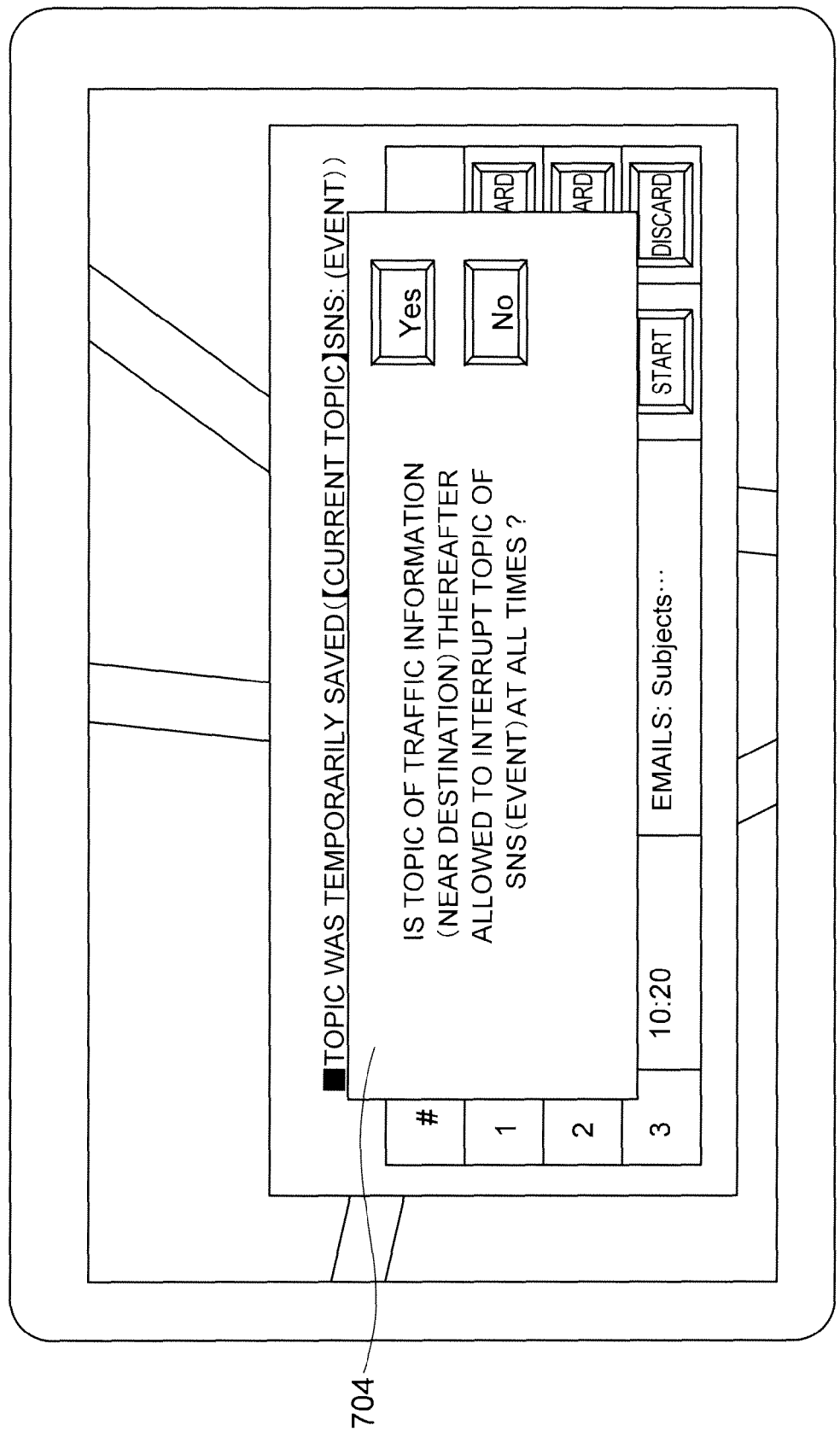

VEHICULAR DEVICE, SERVER, AND INFORMATION PROCESSING METHOD

INCORPORATION BY REFERENCE

The present application claims priority from Japanese application JP 2013-200754 filed on Sep. 27, 2013, the content of which is hereby incorporated by reference into this application.

BACKGROUND OF THE INVENTION

The present invention relates to a vehicular device, server, and method of information processing.

Background art pertinent to the present disclosure is found in JP-A-2003-131691 (patent reference 1). The summary of this reference states that "in a speech dialog system for controlling electrical components in a vehicle, a speech recognition apparatus is activated by outputs from a sensors for detecting the states of various portions of the vehicle. Predetermined words are output from a speech output device in a corresponding manner to the sensor outputs, thus triggering a speech dialog with the user. Consequently, dialogs can be initiated without the user having to provide a timing of speech recognition."

In the above cited patent literature 1, when the speech dialog system voluntarily utters words, it is impossible to dynamically determine or change topics, for example, according to the state of the vehicular driver.

SUMMARY OF THE INVENTION

Accordingly, the present invention offers a speech dialog processing technique permitting speech dialogs with a driver to be done in a preferable manner.

In order to solve the foregoing problem, configurations set forth, for example, in the appended claims are adopted. The present disclosure embraces plural means for solving the problem. One example thereof is a vehicular device adapted for performing processing enabling dialogs with a vehicular driver. The device has a communication portion for performing communications with a server, an output portion for outputting speech information to the driver, an input portion for entering information based on speech uttered by the driver, and a controller for controlling the communication portion, the output portion, and the input portion. When information for triggering a dialog is generated in the vehicular device or in the server, the controller provides control such that information indicative of the type of a first dialog and defining a starting point of a dialog process and information indicative of the type of a second dialog and defining an ending point of the dialog process is received and that the dialog process is carried out based on the received information.

According to the present invention, it is possible to offer a speech dialog processing technique permitting speech dialogs with a vehicular driver to be done in a preferable manner.

Other objects, configurations, and advantageous effects will become apparent from the following description of the preferred embodiments.

BRIEF DESCRIPTION OF THE DRAWINGS

FIG. 4 is an explanatory diagram illustrating a sequence of dialog steps.

FIG. 5 is an explanatory diagram illustrating events and environmental information.

FIG. 7 is another explanatory diagram illustrating dialog domains of the dialog controller and selection of a policy for a transition.

FIG. 8 is a further explanatory diagram illustrating dialog domains of the dialog controller and selection of a policy for a transition.

FIG. 9 is a diagram illustrating the starting and ending points of a sequence of dialog.

FIG. 11 is a diagram illustrating a data structure of the sentence storage portion shown in FIG. 1.

FIG. 12 is a diagram illustrating a data structure of the trigger priority definition library shown in FIG. 1.

FIG. 14 shows another set of information displayed on the display screen of the vehicular device.

DESCRIPTION OF THE EMBODIMENTS

The preferred embodiments of the present invention are hereinafter described with reference to the drawings.

Figure 1:
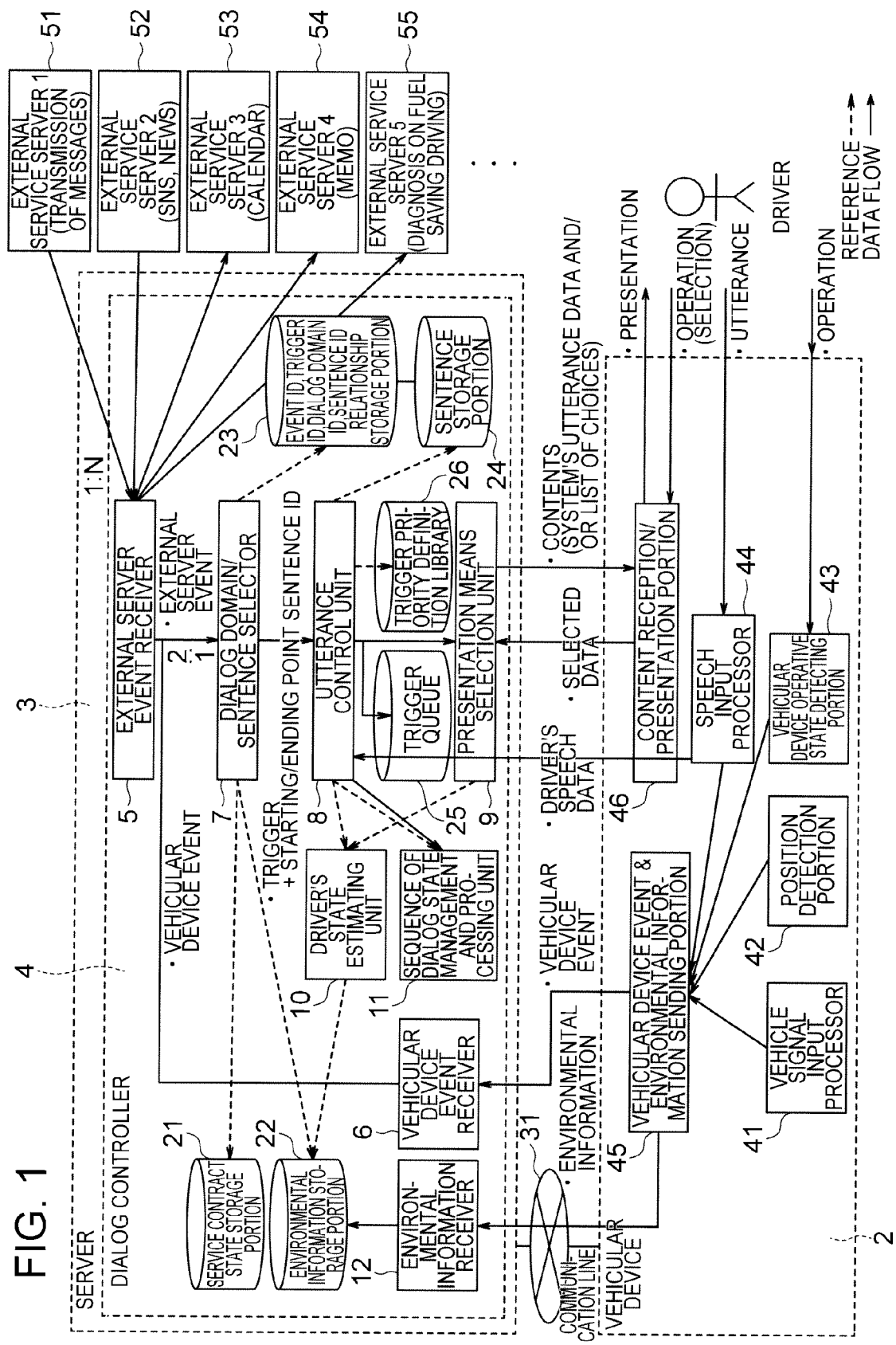
FIG. 1 is a functional block diagram of a dialog support system according to present invention.

The configuration of a dialog support system enabling dialogs with a vehicular driver is first described by referring to FIG. 1, the dialog support system being in accordance with one embodiment of the present invention.

FIG. 1 is a functional block diagram of the hole system associated with the present embodiment. As shown, the dialog support system is configured including a vehicular device 2 and a server 3 connected by a communication line 31 that is a wireless circuit such as a 3G circuit.

The software configuration of the server is described by referring still to FIG. 1. The server 3 has a dialog controller 4 that includes an external server event receiver 5, a vehicular device event receiver 6, a dialog domain/sentence selector 7, an utterance control unit 8, a presentation means selection unit 9, a driver's state estimating unit 10, a dialog state management and processing unit 11, an environmental information receiver 12, a service contract state storage portion 21, an environmental information storage portion 22, an ID relationship storage portion 23, a sentence storage portion 24, a trigger queue 25, and a trigger priority definition library 26.

The external server event receiver 5 receives external server events (described later) from external service servers 51-55. The vehicular device event receiver 6 receives vehicular device events (described later) from the vehicular device 2. The environmental information receiver 12 receives environmental information (described later) from the vehicular device 2. The service contract state storage portion 21 stores the state of a contract of external services (described later) that the driver has made. The environmental information storage portion 22 stores the environmental information received by the environmental information receiver 12.

The ID relationship storage portion 23 stores the relations of event IDs, trigger IDs, dialog domain IDs, and sentence IDs.

These IDs are described. The dialog controller 4 uniquely identifies each individual ones of events, triggers, dialog domains, and sentences by giving an intrinsic ID to each of them. Each event is an external server event or vehicular device event (described later). A trigger sets off a sequence of dialog defined in relation to one event or a combination of plural events. The ID relationship storage portion 23 has a data structure which, when an event ID is entered, can output a corresponding trigger ID.

A dialog domain is one type of dialogs including specific topics and purposes when the vehicular driver and the dialog controller 4 perform a sequence of dialog. For instance, the dialog domain is defined by a title of traffic information, news, a diagnosis on fuel saving driving, or the like.

The ID relationship storage portion 23 has a data structure which, when a trigger ID is entered, can output a corresponding dialog domain ID.

Sentences are the sequences of dialogs exchanged between the driver and the dialog controller 4 in the context of the above-described dialog domain.

Since sentences are exchanged in a sequence of dialog in any dialog domain, each sentence is included in any dialog domain. Therefore, the ID relationship storage portion 23 has a data structure which, when a dialog domain ID is entered, can output corresponding one or plural sentence IDs.

To permit a sentence forming the starting or ending point of a dialog to be distinguished from a sentence forming neither the starting nor ending point of any dialog, attributes such as "starting and end point", "starting point", "ending point", "neither starting point nor ending point", "interim report", and so on are attached to each sentence ID. Then, the sentence ID is stored. When a sentence ID is output, the pertinent attributes are also output.

By attaching attributes in this way, when a dialog domain ID and attribute information are entered, the ID relationship storage portion 23 can extract only sentence IDs having the corresponding attributes from corresponding sentence IDs and output the extracted IDs.

The above-described data structure can be realized by a tree structure where event IDs are at the highest hierarchical level. Trigger IDs, dialog domain IDs, and sentence IDs are at successively lower levels of hierarchy.

Referring back to FIG. 1, the dialog domain sentence selector 7 generates a trigger of a sequence of dialog in response to events received from the external server event receiver 5 and from the vehicular device event receiver 6 and using the information stored in the service contract state storage portion 21, in the environmental information storage portion 22, and in the ID relationship storage portion 23, and extracts a sentence ID forming a starting point and a sentence ID forming an ending point using the information stored in the sentence storage portion 24. The generated trigger and extracted sentence IDs are sent to the utterance control unit 8. The sequence of dialog includes sentences uttered by the driver and sentences uttered by the system. This will be described in further detail later.

The sentence storage portion 24 interrelates sentences uttered in a sequence of dialog with sentence IDs and stores them. The driver's state estimating unit 10 estimates the driver's state (described later) according to the environmental information in the environmental information storage portion 22. The dialog state management and processing unit 11 manages the state of the system, e.g., makes a decision as to whether the driver and system are engaged in a sequence of dialog.

The utterance control unit 8 extracts the sentence IDs of sentences actually used in dialogs from plural sentence IDs received from the dialog domain/sentence selector 7 according to the state of the driver managed by the driver's state estimating unit 10. Furthermore, the controller provides control such that speech is uttered to the driver according to previously defined correlations, the speech being composed of sentences indicated by data about the uttered speech based on the contents of the speech uttered by the driver. The data about the speech uttered by the driver may be either speech data or data obtained by converting data on speech uttered by the driver into textual data.

When a trigger is received, the state of the dialog state management and processing unit 11 is referenced. If the result of the decision is that a sequence of dialog is in progress, 1) the received trigger is temporarily put in the trigger queue 25 or 2) the trigger priority definition library 26 is referenced. If the priority of the received trigger is high, the sequence of dialog currently in progress is interrupted and a sequence of dialog responsive to the received trigger is initiated. If any sentence responsive to a sentence ID at, the ending point is uttered, then termination of the sequence of dialog is recorded in the dialog state management and processing unit 11.

The presentation means selection unit 9 determines whether an utterance is made for the user, a GUI (graphical user interface) presented to the driver to select a reply in response to an inquiry from the system, or both utterance and presentation are provided, depending on the state of the driver. The selected content is sent to the vehicular device 2.

The content is composed of data on utterances made by the system and/or a list of choices. The data on utterances made by the system may be textual data or voice data.

The software configuration of the vehicular device 2 is next described by referring to FIG. 1. The vehicular device 2 has a vehicle signal input processor 41, a position detection portion 42, a vehicular device operative state detecting portion 43, a speech input processor 44, a vehicular device event/environmental information sending portion 45, and a content reception/presentation portion 46.

Figure 2:
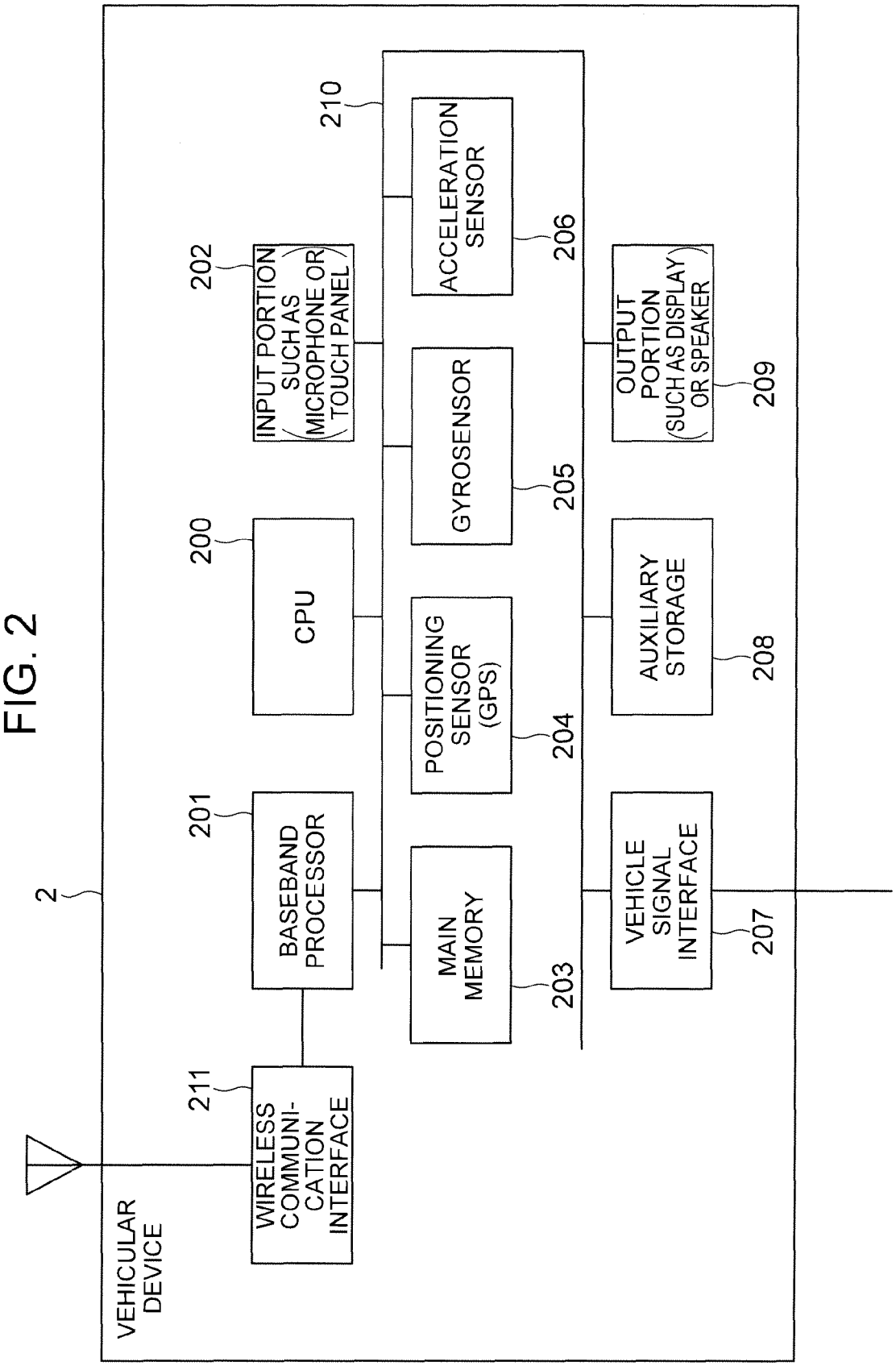
FIG. 2 is a block diagram of the hardware of the vehicular device shown in FIG. 1.

Referring also to FIG. 2, the vehicle signal input processor 41 references information about CAN (Control Area Network) about the vehicle through a vehicle signal interface 207. One example of the CAN information is the state of the vehicle included in environmental information described later. One example of the state of the vehicle is a great change in acceleration or speed. The position detection portion 42 detects the position of the vehicle from data obtained by a positioning sensor 204, a gyrosensor 205, and an acceleration sensor 206 which are described later. The vehicular device operative state detecting portion 43 monitors the state of operation of the vehicular device operated by the driver, the state of operation being stored in the vehicular device. One example of the state of operation is that the driver is manipulating a car navigation system, e.g., performing operations on a menu of a car navigation application.

The speech input processor 44 receives driver's Voices as an input through a microphone of an input portion 202 described later. Furthermore, the speech input processor 44 monitors the state of the Vehicle interior represented by the environmental information as described later. One example of the state of the vehicle interior is that voices of one or more persons are being entered into the microphone.

The vehicular device event/environmental information sending portion 45 generates vehicular device events and/or environmental information based on information coming from the vehicle signal input processor 41, position detection portion 42, and vehicular device operative state detecting portion 43 and sends the generated events or information to the server 3.

The content reception/presentation portion 46 receives contents from the server and presents them to the driver. In playing the contents according to data about utterances made by the system, a TTS (Text To Speech) function for converting textual data into speech data and reproducing speech can be used. The aforementioned list of options is a list of contents presented to the user to make a choice between. A and B such as "A: Yes; B: No" and "A: noun 1; B: noun 2". This list of options is presented while being overlapped onto GUI buttons by the content reception/presentation portion 46, thus prompting the driver to make a choice.

FIG. 2 is a block diagram of the hardware of the vehicular device. As shown, the hardware of the vehicular device 2 has a CPU 200, a baseband processor 201, the input portion 202 a main memory 203, the positioning sensor 204, the gyrosensor 205, the acceleration sensor 206, the vehicle signal interface 207, an auxiliary storage 208, a display portion 209, and a wireless communication interface 211. These components are interconnected by a bus 210.

The CPU (Central Processing Unit) 200 is an arithmetic and control unit for controlling the various components or the vehicular device 2 and executing application software for the vehicular device to implement the various components of the vehicular device 2 shown in FIG. 1. The application software is loaded in the main memory 203. The storage devices of the vehicular device 2 shown in FIG. 1 are mounted in the auxiliary storage 208 and referenced from these components.

The input portion 202 is made of buttons, switches, a keyboard, a touch panel, a microphone, or the like operated by user's fingers to control the vehicular device 2. The main memory 203 is a semiconductor storage which loads the program stored in the auxiliary storage 208 and which temporarily stores the program or stores working data.

The wireless communication interface 211 is an interface device that converts a signal from the baseband processor 201 into an RF signal in the wireless band or conversely transforms an RF signal in the wireless band into a signal adapted for the baseband processor 201. The vehicular device 2 performs communications with the server 3 via the communication line 31 such as the Internet and via the wireless communication interface 211. If necessary, the vehicular device 2 exchanges information or downloads data.

The positioning sensor 204 is used to measure the position of this sensor indicated by a latitude and a longitude on the Earth's surface. The gyrosensor 205 is a sensor for measuring the angle or angular velocity of the vehicle in which the gyrosensor is mounted. The acceleration sensor 206 is a sensor for measuring the acceleration of the vehicle in which this sensor is mounted.

The vehicle signal interface 207 is an interface device for connecting signal lines. This interface can accept signals indicative of the state of motion of the vehicle and internal state. The auxiliary storage 208 is a mass storage that stores various kinds of data such as a map database and application software for the vehicular device. For example, the auxiliary storage is a HDD (hard disc drive) or SSD (solid state drive). The output portion 209 is a component for outputting image information and voice information to a liquid-crystal display or organic electroluminescence display or to a driver device such as a speaker.

Figure 3:
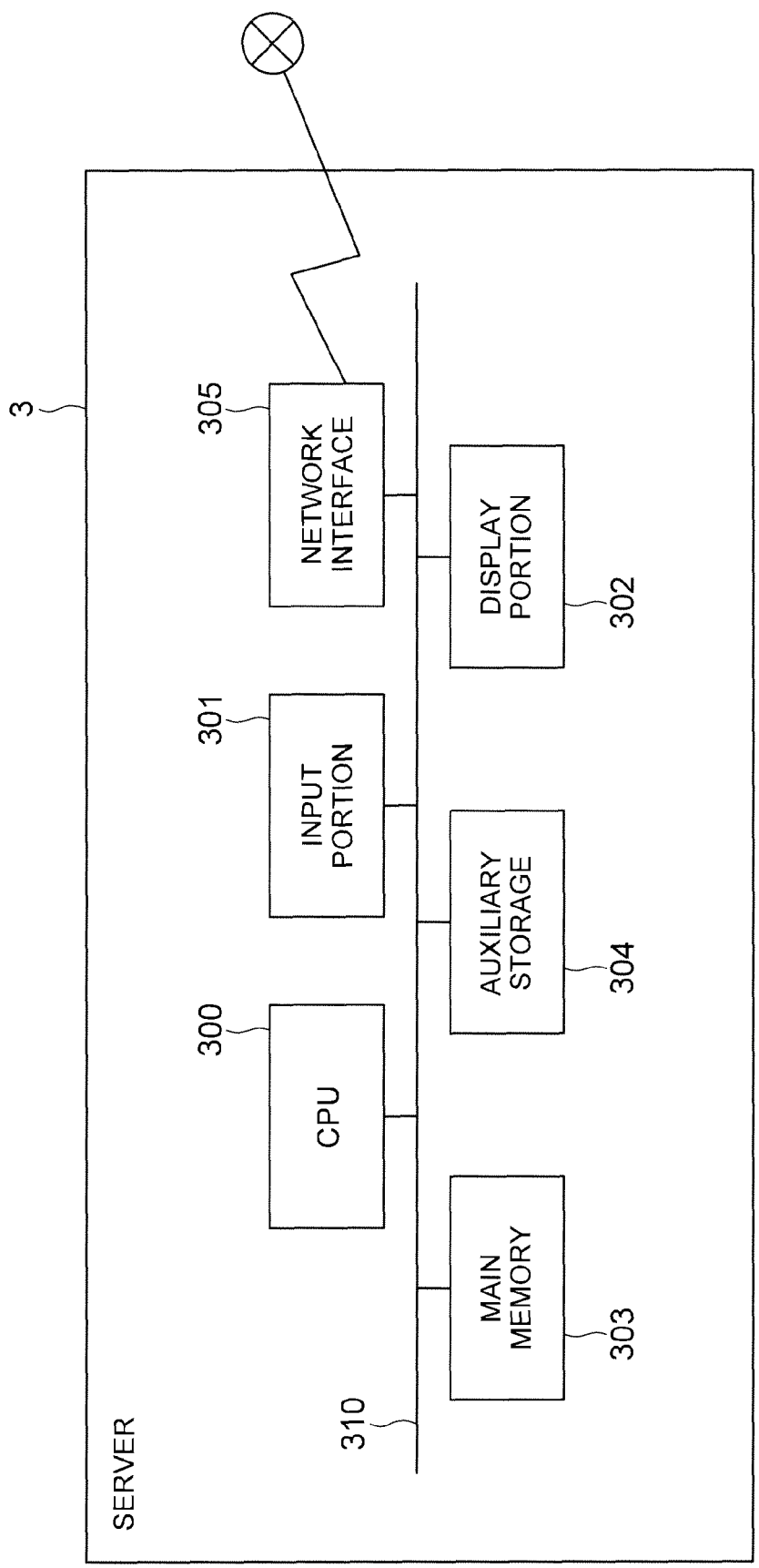
FIG. 3 is a block diagram of the hardware of the server shown in FIG. 1.

FIG. 3 is a block diagram of the hardware of the server 3. As shown, the server 3 includes hardware components, i.e., a CPU 300, an input portion 301, a display portion 302, a main memory 303, an auxiliary storage 304, and a network interface 305, which are interconnected by a bus 310.

The CPU 300 controls the various components of the servers. The CPU loads the program and data stored in the auxiliary storage 304 onto the main memory 303 and executes the program. The various components of the server 3 shown in FIG. 1 are implemented as application software. The storages of the server 3 shown in FIG. 1 are mounted in the auxiliary storage 304 and referenced from the components. The input portion 301 is a keyboard or mouse. The administrator enters commands from the input portion 301.

The display portion 302 is a liquid-crystal display, organic electroluminescence display, or the like. The results of monitoring of the operative state and the output results are displayed on this display portion. The main memory 303 is a semiconductor memory that loads the program stored in the auxiliary storage 304, temporarily stores the program, or stores working data.

The auxiliary storage 304 is a memory such as a HDD or HDDs that store data and programs. In the case of the server 3, HDDs may be interconnected to constitute a disk array. The network interface 305 is an interface for connection with the communication line 31. Consequently, communications with an external device are performed.

The dialog controller 4 described in connection with FIG. 1 may be incorporated either in the above-described system which includes both the server 3 and the vehicular device 2 or in a system consisting only of the vehicular device 2.

The aforementioned sequence of dialog is described next by referring to FIG. 4. In the present embodiment, a dialog domain corresponding to the type of an external service (401) that is an application loaded on the vehicular device 2 or server 3 such as "diagnosis on fuel saving driving", "SNS (social network in service), or "calendar". One dialog domain may be made to correspond either to a kind of external service in a one-to-one relationship or to plural types of external services. Furthermore, one dialog domain may be made to correspond to other than external service type. In the present embodiment, it is assumed that a sequence of dialog is constituted by first selecting a dialog domain and then selecting sentences to be uttered in practice from within the dialog domain according to the state of the driver. Consequently, the driver can perform dialogs while making use of contracted or downloaded services that the driver is intended to use. When the driver is in a condition adapted for dialogs, the dialogs can be made to progress so as to achieve the purpose of the dialog domain. When the driver is not in a condition adapted for dialogs, the purpose of the dialog domain will be achieved later and the dialogs may be cut short.

FIG. 4 gives an example in which a dialog domain is made to correspond to "diagnosis on fuel saving driving" in a one-to-one relationship as one type of external service. FIG. 4 also gives an example in which a transition of dialog domain is made from "SNS" to "calendar" to cite an example where a dialog domain is made to correspond to plural types of external services.

One type of trigger (402) of initiation of a dialog is an event from the vehicular device (hereinafter may be referred to as a vehicular device event) Another type is an event from an external service server (hereinafter may be referred to as an external server event).

It is assumed that a sequence of dialog in each dialog domain is composed of plural sentences including sentences uttered by the driver and sentences uttered by the system as set forth in 403 in FIG. 4.

Events and environmental information used in the present embodiment and the driver's state estimated from the environmental information are described next by referring to FIG. 5.

Events include external server events and vehicular device events. An external server event is produced by an external server, for example, when there is fresh news on an external server, a message is received by SNS on the external server, a schedule is registered on a calendar of the external server, or there is information based on news, weather, or the like on the external server.

A vehicular device event is produced by the vehicular device. For example, it is produced when the operational state of an application loaded on the vehicular device has varied, the driver has performed an operation on the application, the condition has varied in the route guided by a navigation application loaded on the vehicular device (e.g. an accident has occurred), or information regarding the circumstances of the vehicle has been read aloud by the vehicular device (e "Please pay attention to a merging vehicle coming from the left" or "There is a highway entrance, about 700 meters ahead." Other examples include when ACC is turned ON, when the positional information indicates that the vehicle is near a given building such as a gas station, when the parking brake is released, and when a given time has passed since release of the parking brake, when a destination is set after getting in the vehicle, and when positional information has been sent from the vehicular device to the server.

The environmental information includes information about the vehicular circumstances, information about vehicle interior circumstances, and information about circumstances of the vehicular device. The vehicular circumstances are detected via the vehicle signal interface 207. Such circumstances are detected, for example, when the acceleration or speed has changed greatly, the horn is blown, or the vehicle is going for the purpose of parking (in motion for parking in a parking lot).

The circumstances of the vehicle interior indicate whether a person is present within the vehicle interior, a person is uttering to the microphone in the vehicle interior, or persons are conversing in the vehicle interior. For example, a decision is made according to whether, voice is being input to the microphone or whether voices from plural persons are input to the microphone.

The circumstances of the vehicular device indicate how the vehicular device is being operated by the driver (such as when a menu of the car navigation system is being operated), how the voice resources such as microphone and speakers are being used by an application loaded onto the vehicular device, and circumstances capable of being detected by applications of the car navigation of the vehicular device "entering/leaving highway", "entering/leaving highway junction", and "starting/ending of backing").

The driver's state estimating unit 10 described in connect on with FIG. 1 estimates the driver's state from environmental information. For example, in the present embodiment, the driver's state is defined in terms of plural levels: "very busy", "somewhat busy", and "non-busy". A given interval of time (e.g., 30 seconds) since reception of any part of the environmental information is defined to be in a "very busy" state. An interval of time (e.g., from 30 seconds to 120 seconds after the reception) following the given interval of time is defined to be in a "somewhat busy" state. Other intervals of time (120 seconds and on since the reception) are defined to be in a "non-busy" state. Depending on the type of the environmental information, if the information is received, the state may be deemed as "somewhat busy" rather than as "very busy." For example, when vehicular circumstances put in #3 of FIG. 5 are received, the state is regarded as "very busy" However, when the vehicle interior circumstances put in #4 of FIG. 5 are received, the state may be regarded as "somewhat busy". Consequently, processing can be performed while reflecting the driver's state more precisely.

Figure 6:
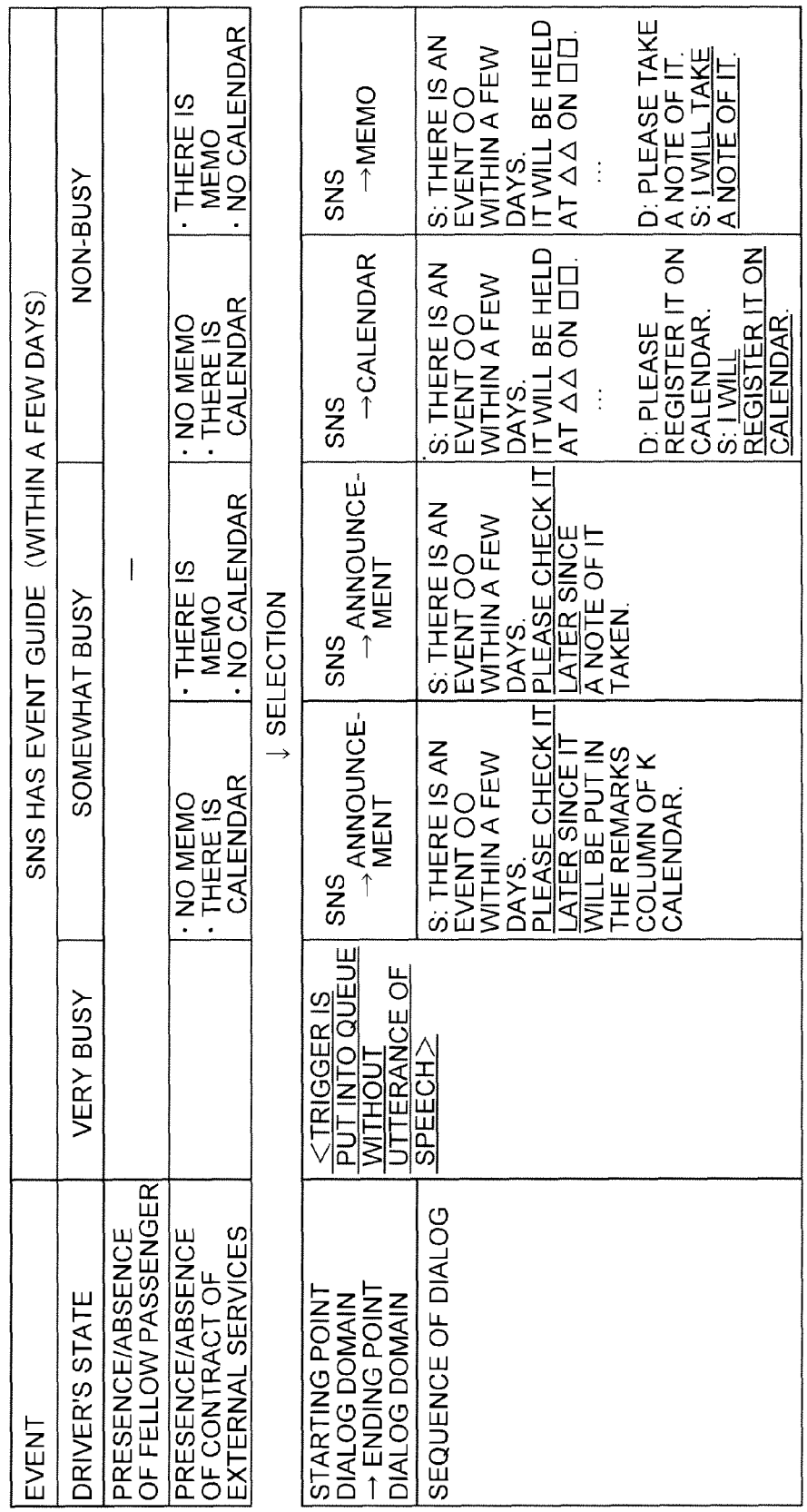
FIG. 6 is an explanatory diagram illustrating dialog domains of the dialog controller shown in FIG. 1 and selection of a policy for a transition.

FIG. 6 is an explanatory diagram illustrating dialog domains of the dialog controller 4 associated with the present embodiment and selection of a policy for a transition. In the illustrated example, a dialog domain forming a starting point (hereinafter may be referred to as a starting point dialog domain) is selected according to events and a dialog domain forming an ending point (hereinafter may be referred to as an ending point dialog domain) is selected according to the driver's state and according to whether there is a contract of external services That is, dialog domains and a policy of making a transition are shown. In the example of FIG. 6, "memo" and "calendar" are given as types of external services.

The decision as to whether there is a contract of external services is made depending on whether a contract to use external services such as "memo" and "calendar" is already put in place by the driver. If the contract is already in place, the contract is judged to be "present". If not in place, the contract is judged to be "absent". It is possible to determine whether a contract is "present" or "absent", depending on whether an account such as a user ID and a password for use of external services have been already obtained.

It is assumed that the dialog domain/sentence selector 7 already described in connection with FIG. 1 has received an event "SNS has a guide to an event (taking place within a few days)" as an external event. In this case, if the driver's state is "very busy", a trigger corresponding to the event is put into the trigger queue 25. At this time, no utterances are made to prevent the driver from being bothered.

On the other hand, when the driver's state is "somewhat busy" or "nor-busy", starting point dialog domain and a starting point sentence (sentence forming a starting point) are selected according to whether there is a contract of external services. For example, when the driver's state is "somewhat busy", a sequence of dialog is terminated with utterance of only a single sentence. In this way, the driver is prevented from becoming bothered. When the driver's state is "non-busy", a dialog is performed using plural sentences to prompt the driver to make use of the functions of contracted external services.

FIG. 7 shows another example of selection of a dialog domain and a policy of transition performed by the dialog controller 4 associated with the present embodiment. In this case, the types of external services are "weather" and "traffic information". It is assumed in FIG. 7 that the dialog domain/sentence selector 7 has received an event "SNS has a guide to (today's) event" as an external server event. Sentences associated with the dialog domains of "weather" and "traffic information" are in underlined locations.

FIG. 8 illustrates a further example of selection of a dialog domain and a policy of a transition performed by the dialog controller 4 associated with the present embodiment. In this example, the types of external services are "SNS" and "calendar" each having a public mode and a private mode. It is assumed in FIG. 8 that the dialog domain/sentence selector 7 has received an event "SNS has a guide to an event (within a few days)" as an external server event. In the public mode, a user who uses external services registers and references information on the assumption that the user himself/herself and other persons can reference information. On the other hand, in the private mode, a user who uses external services registers and references information on the assumption that only the user himself/herself can reference information the present embodiment, it is assumed that "SNS (public mode)", "SNS (private mode)", "calendar (public mode)", "calendar (private mode)", and so on constitute respective dialog domains.

In FIG. 8, "presence/absence of fellow passenger" is determined either according to information from seat sensors obtained by the dialog domain/sentence selector 7 through the vehicle signal input processor 41 or according to environmental information indicating whether voices from plural persons taken from the speech input processor 44 are being input into the microphone.

If a fellow passenger is "present", only information (indicated by two black circles in this example) treated by the SNS (public domain) taken as a topic. Only information treated by the calendar (public domain) is referenced, displayed, and registered.

On the other hand, if any fellow passenger is "absent", information (indicated by two white circles in this example) treated by the SNS (private mode) is taken as a topic. Information treated by the calendar (private mode) is also referenced, displayed, and registered.

FIG. 9 illustrates the starting point and ending point of a sequence of dialog associated with the present embodiment. The dialog domain/sentence selector 7 selects the starting and ending point sentences. Plural candidate sentences may be selected. A sentence that is the starting point and, at the same time, the ending point may be present.

By uttering a sentence forming a starting point, the utterance control unit 8 enters the process of a sequence of dialog that is in progress. By uttering any sentence forming an ending point, it is determined that the sequence of dialog has ended.

Figure 10:
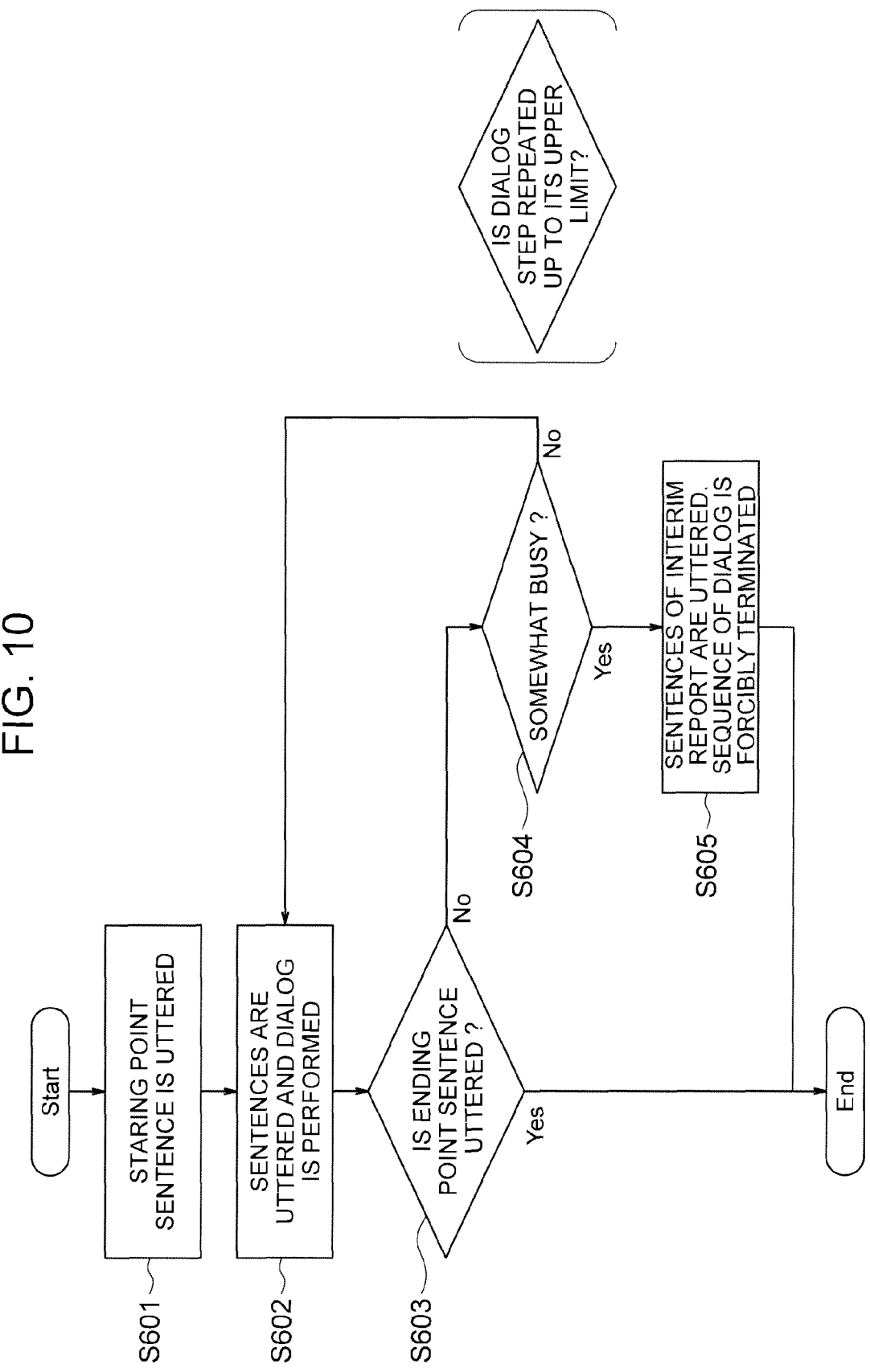
FIG. 10 is a flowchart illustrating a subroutine performed by the dialog controller

FIG. 10 is a flowchart illustrating a subroutine performed by the utterance control unit 8 associated with the present embodiment. The control unit 8 utters a sentence forming a starting point (S601). Then, the control unit utters sentences responsive to the sentences Littered by the driver (S602). If the utterance control unit 8 utters a sentence forming an ending point (Yes at step S603) the sequence of dialog is ended.

On the other hand, if the utterance control unit 8 has not yet uttered any sentence forming an ending point (No at step S603), a decision is made as to whether or not the driver's state is "somewhat busy" (S604). If so (Yes at step S604), a sentence is uttered to give an interim report that suggests prompting to a dialog domain forming an ending point such as "although it was desired to register a schedule on the calendar, this proposal is halted". Then, the system forcibly terminates the sequence of dialog (S605). Instead of making a check if the driver's state is "somewhat busy", the system may forcibly terminate the sequence of dialog depending on whether the number of dialog steps has reached a predetermined maximum number.

One example of the case where the driver's state is not somewhat busy is that the driver is "very busy". Another example is that the driver is "non-busy". In the case where the driver is "very busy", utterance of a sentence forming a starting point (S601) is not started and the sequence of dialog is not initiated. If a transition is made from any one of the other two states to the state of "very busy" during steps S601 to S605, the execution of these steps S601 to S605 may be immediately interrupted and ended, for example, by sending a command to the vehicular device 2 from the server 3 to terminate the sequence of dialog. This can reduce the load on the driver.

If the driver's state is not "somewhat busy" (No at step S604), i.e. "non-busy" sentences are immediately uttered to continue the sequence of dialog (S602).

As such, if the driver's state has changed to "somewhat busy" after the start of the sequence of dialog, or if it takes forever for the sequence of dialog to reach its ending point and it is impossible to induce the driver to an intended external service function, the sequence of dialog can be terminated without wasting the dialogs performed up to this point.

FIG. 11 shows the data structure of the sentence storage portion 24 already described in connection with FIG. 1. A sentence ID is correlated to each sentence and stored in this storage portion.

The dialog domain/sentence selector 7 extracts a sentence ID forming a starting point, a sentence ID forming an ending point, and a sentence ID forming a starting point and at the same time an ending point according to information stored in the sentence storage portion 24 as described previously.

Then, the utterance control unit 8 temporarily stores the sentence ID extracted by the dialog domain/sentence selector 7 as described previously.

The utterance control unit 8 references the sentences in the sentence storage portion 24 and sentence IDs when sentences responsive to sentences uttered by the driver are uttered to the driver in accordance with previously defined relationships. The control unit 8 then checks whether each of such IDs is a sentence ID forming a starting point, an ending point, or a staring and ending point temporarily stored as described previously.

If a sentence to be uttered is a sentence ID forming a starting point, the utterance control unit 8 registers information indicating that the sequence of dialog is still in progress in the dialog state management and processing unit 11. On the other hand, if the sentence is a sentence ID forming an ending point or a starting and ending point, the control unit 8 registers information indicating that the sequence of dialog is not in progress in the dialog state management and processing unit 11. In the case where the sentence ID is neither a starting point nor an ending point, the state managed by the management and processing unit 11 is not varied.

FIG. 12 shows the data structure of the trigger priority definition library 26 already described in connection with FIG. 1. Triggers corresponding to events and their priorities are put in the trigger priority definition library 26 in terms of numerical values.

Each trigger may be generated in response to a combination of plural events "ACC is turned ON" and "positional information indicates that there is a gas station in the neighborhood"). With respect to priorities, triggers having priority values 0 to 99 are assumed to have "high" priority. A sequence of dialog responsive to a trigger having a "high" priority is allowed to interrupt the process even if another dialog process is in progress. Triggers having priority values 100 to 199 are assumed to have "moderate" priority. A sequence of dialog responsive to a trigger having a "moderate" priority is temporarily saved in the trigger queue 25 already described in connection with FIG. 1 if another sequence of dialog is in progress. Triggers having priority values of 200 to 299 are assumed to have "low" priority. A sequence of dialog responsive to a trigger having a "low" priority is not temporarily saved in the trigger queue 25 but discarded if a farther sequence of dialog is in progress.

Numerical values indicative of priorities may be previously set by the system administrator. A given expiration period (e.g., 480 seconds) may be attached to each trigger temporarily stored in the trigger queue 25 and such triggers may be discarded if the expiration period expires.

Figure 13:
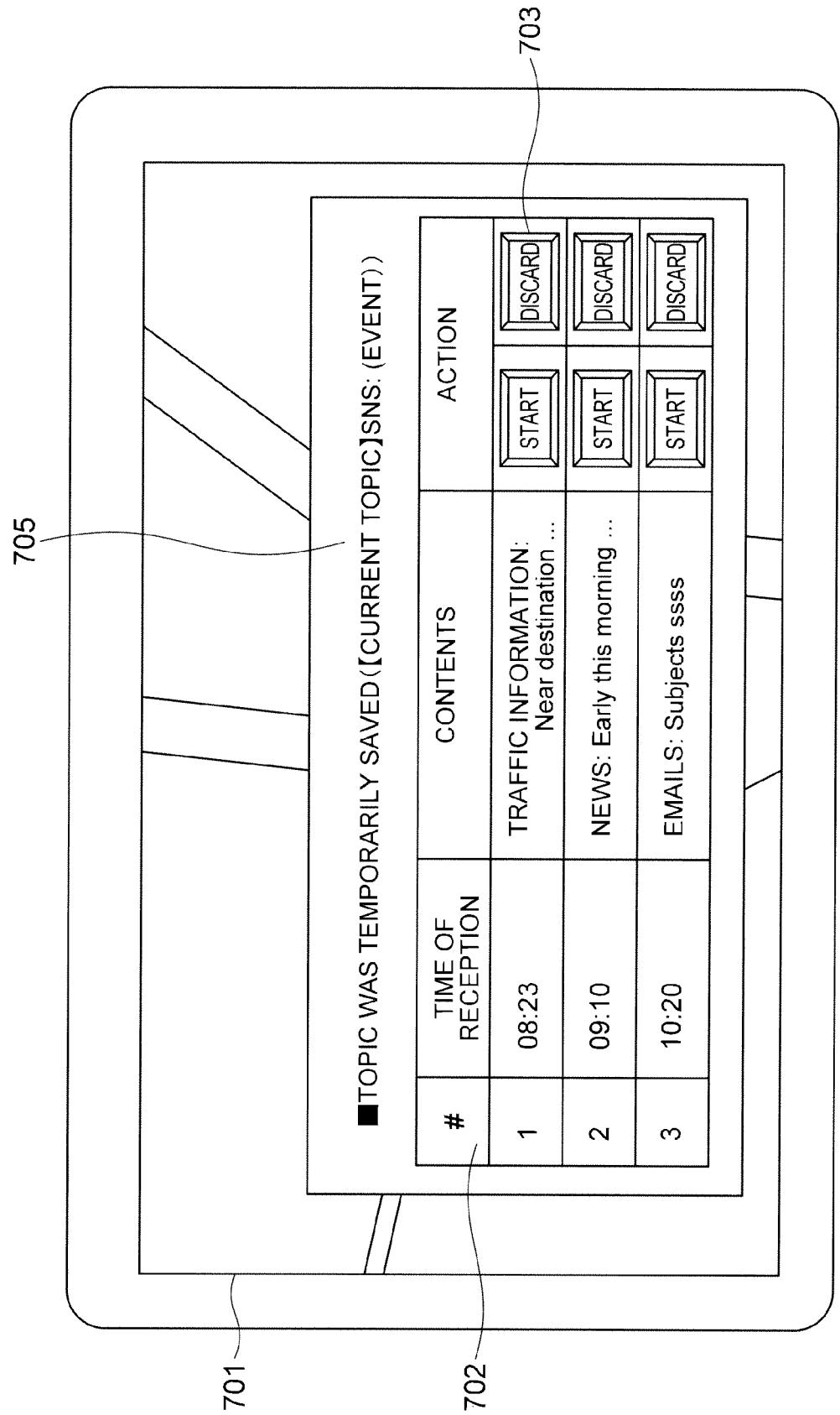
FIG. 13 shows one set of information displayed on the display screen of the vehicular device shown in FIG. 1.

A procedure for making a decision as to whether a sequence of dialog is allowed to be interrupted according to driver's intent is described as one example of another subroutine by referring to FIG. 13.

If generation of a trigger responsive to an event is detected during a sequence of dialog, the dialog controller 4 saves the trigger in the trigger queue 25 and sends various kinds of data including, 1) a dialog domain responsive to the trigger and a summary of the contents of uttered sentences, 2) the instant when the trigger was generated, and 3) a trigger ID permitting the dialog controller 4 to uniquely identify the trigger, to the content reception/presentation portion 46 of the vehicular device 2.

When information is received, the content reception/presentation portion 46 gives an audible notice to the driver and presents the received information 1) and 2) above on the display screen 701 of the vehicular device along with control buttons 703 for prompting discarding or starting (702).

When the driver wants to interrupt the sequence of dialog in operation and to start the presented dialog, the driver depresses the "start" button, whereupon the content reception/presentation portion 46 sends a corresponding signal and a trigger ID to the dialog controller 4.

When information is received, the dialog controller 4 selects sentences responsive to the trigger ID by referencing the ID relationship storage portion 23 and the sentence storage portion 24 as described previously and sends the selected sentences to the content reception/presentation portion 46. In this way, the driver can newly initiate the sequence of dialog selected by the driver.

If the driver is not interested in the presented dialog, the driver depresses the "discard" button. It is also possible to intentionally discard the selected sequence of dialog by transmitting information between the dialog controller 4 and the content reception/presentation portion 46.

Furthermore, the dialog controller 4 detects that the driver places higher priority to the sequence of dialog in the selected dialog domain than the sequence of dialog in the dialog domain in effect by depression of the "start" button by the driver. The dialog controller 4 can record that one dialog domain is of higher priority than another dialog domain, for example, by detecting a given number of events of this type and a new sequence of dialog can be made to interrupt the sequence of dialog in effect without having to wait for depression of the "start" button by the driver.

In this case, a new sequence of dialog may be made to automatically inter apt the process after obtaining a driver's consent in advance by presenting a message 704 as shown in FIG. 14 to the driver. In a case where the "start" button about traffic information is often depressed by the driver about an event in SNS during a sequence of dialog, a sentence for obtaining a driver's consent such as the message 704 is presented.

When a transition to a new sequence of dialog is made, a message 705 to the effect that the interrupted topic is temporarily stored as shown in FIG. 13 may be displayed. This can further enhance the driver's convenience.

If the dialog controller 4 detects a given number of depressions of the "discard" button, the dialog controller 4 can record that the sequence of dialog in the selected dialog domain will be discarded during the sequence of dialog in the dialog domain in effect and discard the new sequence of dialog automatically without having to wait for a driver's depression of the "discard" button.

By setting a given expiration period (e.g., 180 seconds), information may be presented only within the given expiration period (702).

One example of GUI provided by the presentation means selection unit 9 in the present embodiment is a button on which a reply such as "make a memo" or "registered on calendar" is set forth in a case where the SNS presents a guide to an event. This example of GUI corresponds to system's utterances such as "Do you make a memo or is it registered on the calendar?". When the driver's state is "somewhat busy", the presentation means selection unit 9 permits only utterances from the system. When the driver's state is "non-busy", the selection unit 9 sends contents to the vehicular device 2 such that utterances from the system and GUI display can both be accomplished.

According to the present embodiment described so far, when "a sequence of dialog" is performed using voluntary speeches as starting points triggered by plural events originating from different sources of transmission, it is possible to select a dialog domain and a policy of transition in conformity with the driver's state and the state of contract of services. Furthermore, the chance of speech can be preserved while suppressing dialogs from being interrupted. Speech can be uttered at appropriate times.

It is to be understood that the present invention is not restricted to the above-described embodiments but rather embraces various modifications. The above embodiments have been set forth in detail for ease of understanding of the invention. However, the invention is not always restricted to one having all the configurations already described. Furthermore, some components of one embodiment may be replaced by components of other embodiment. In addition, configurations of other embodiment may be added to configurations of some embodiment. Further, with respect to some configurations of each embodiment, other configurations may be added, deleted, or replaced.

Furthermore, control lines and information lines which are considered to be necessary for explanation are shown. Note that not all control lines and information lines of products are shown. It can be considered that almost all configurations are interconnected in practice.

Additionally, in the embodiments described so far, an example in which a server is fitted with the dialog controller 4 is shown. The vehicular device 2 may perform processing similar to processing performed by the dialog controller 4.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicular device for performing dialogs with a vehicular driver, comprising:
    a communication portion which communicates with a server;
    an output portion which outputs speech information to the driver;
    an input portion which inputting information based on speech uttered by the driver; and
    a controller which controls the communication portion, the output portion, and the input portion;
    wherein, when trigger information for starting a dialog process is generated in the vehicular device or in the server, the controller receives information indicative of the type of a first dialog forming a starting point of the dialog process and information indicative of the type of a second dialog forming an ending point of the dialog process from the server and carries out the dialog process based on the received information, the type of the second dialog being different from the type of the first dialog.

2. The vehicular device according to claim 1, wherein the output portion can terminate the dialog process according to a variation in the driver's state even if the dialog process does not reach the type of the second dialog.

3. The vehicular device according to claim 1, wherein the output portion does not initiate a dialog process responsive to new trigger information until the first-mentioned dialog process ends even if the new trigger information is generated in the vehicular device or in the server.

4. The vehicular device according to claim 1, wherein the communication portion receives information indicative of the type of the second dialog from the server, the type of the second dialog being different for different types of software application loaded on the vehicular device or on the server.

5. The vehicular device according to claim 1, wherein the communication portion receives information indicative of the type of the second dialog from the server, the type of the second dialog being different depending on whether or not there is a fellow passenger.

6. The vehicular device according to claim 1, wherein there is further provided a detection portion for detecting environmental information indicating at least any one type of vehicular circumstances, vehicle interior circumstances, and operative state of the vehicular device, and wherein the communication portion sends the environmental information detected by the detection portion to the server.

7. A server capable of communicating with a vehicular device that performs dialogs with a vehicular driver, comprising:
    a communication portion which communicates with the vehicular device; and
    a controller which controls the communication portion;
    wherein the controller provides control such that, when trigger information initiating a dialog process is generated in the vehicular device or in the server, the controller sends information, indicative of the type of a first dialog forming a starting point of the dialog process and information indicative of the type of a second dialog forming an ending point of the dialog process to the vehicular device, the type of the second dialog being different from the type of the first dialog.

8. The server according to claim 7, wherein the communication portion can send information for terminating the dialog process according to a variation in the driver's state even if the dialog process in the vehicular device does not reach the type of the second dialog.

9. The server according to claim 7, wherein the communication portion sends neither information indicative of the type of the first dialog based on new trigger information nor information indicative of the type of the second dialog to the vehicular device until the dialog process in the vehicular device ends, even if the new trigger information is generated in the vehicular device or in the server.

10. The server according to claim 7, wherein the communication portion sends information indicative of the type of the second dialog to the vehicular device, the type of the second dialog being different for different types of software application loaded on the vehicular device or on the server.

11. The server according to claim 7, wherein the communication portion sends information indicative of the type of the second dialog to the vehicular device, the type of the second dialog being different depending on whether or not there is a fellow passenger.

12. The server according to claim 7, wherein the communication portion receives environmental information indicating any one type of vehicular circumstances, circumstances of the vehicle interior, and operative state of the vehicular device from the vehicular device, and wherein the controller determines the type of the second dialog based on the environmental information received by the communication portion.

13. A method of information processing in a system including a vehicular device for performing dialogs with a vehicular driver and a server capable of communicating with the vehicular device, the method comprising the steps of:
    detecting environmental information indicative of any one type of circumstances of a vehicle, circumstances of the vehicle interior, and operative state of the vehicular device by a detection portion of the vehicular device;
    generating first information and second information by a generation portion of the server when trigger information initiating a dialog process in the vehicular device or in the server is generated, the first information indicating the type of a first dialog forming a starting point of the dialog process and corresponding to the trigger information, the second information indicating the type of a second dialog forming an ending point of the dialog process and corresponding to the environmental information, the type of the second dialog being different from the type of the first dialog; and
    performing the dialog process with the driver by an output portion of the vehicular device based on the generated first and second information.

* * * * *